United States Patent
Kuttuva Jeyaram et al.

(10) Patent No.: US 12,058,210 B2
(45) Date of Patent: *Aug. 6, 2024

(54) MULTICHANNEL VIRTUAL INTERNET PROTOCOL ADDRESS AFFINITY

(71) Applicant: Cohesity, Inc., San Jose, CA (US)

(72) Inventors: Krishna Ram Kuttuva Jeyaram, Milpitas, CA (US); Vijay Panghal, Milpitas, CA (US); Ganesha Shanmuganathan, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,402

(22) Filed: Jun. 2, 2023

(65) Prior Publication Data
US 2023/0308511 A1    Sep. 28, 2023

Related U.S. Application Data

(63) Continuation of application No. 17/154,862, filed on Jan. 21, 2021, now Pat. No. 11,706,298.

(51) Int. Cl.
*H04L 67/1097* (2022.01)
*H04L 45/24* (2022.01)
*H04L 61/4535* (2022.01)
*H04L 61/5061* (2022.01)

(52) U.S. Cl.
CPC ........ *H04L 67/1097* (2013.01); *H04L 45/245* (2013.01); *H04L 61/4535* (2022.05); *H04L 61/5061* (2022.05)

(58) Field of Classification Search
None
See application file for complete search history.

(56) References Cited

U.S. PATENT DOCUMENTS

| | | | |
|---|---|---|---|
| 6,430,622 B1* | 8/2002 | Aiken, Jr. | H04L 61/00 709/239 |
| 7,020,796 B1 | 3/2006 | Ennis | |
| 9,690,675 B2* | 6/2017 | Madduri | G06F 11/1425 |
| 11,706,298 B2* | 7/2023 | Kuttuva Jeyaram | H04L 61/5061 709/245 |

(Continued)

FOREIGN PATENT DOCUMENTS

| | | | | |
|---|---|---|---|---|
| WO | WO-2009050202 A2 * | 4/2009 | | H04L 29/12952 |
| WO | WO-2016010912 A1 * | 1/2016 | | H04L 47/827 |

OTHER PUBLICATIONS

Microsoft Docs, "Assign multiple IP addresses to virtual machines using the Azure portal", Nov. 30, 2016, Retrieved online on Aug. 20, 2021 from https://docs.microsoft.com/en-us/azure/virtual-network/virtual-network-multiple-ip-addresses-portal. (Year: 2016).

(Continued)

*Primary Examiner* — Hitesh Patel
*Assistant Examiner* — Sandarva Khanal
(74) *Attorney, Agent, or Firm* — Shumaker & Sieffert, P.A.

(57) ABSTRACT

A plurality of virtual internet protocol addresses for a first single network interface card of a node of a storage cluster are provided to a client. A separate connection is established between the client and the node for each of the plurality of virtual internet protocol addresses. The separate connections are utilized together in parallel to transfer data between the client and the node.

19 Claims, 7 Drawing Sheets

(56) References Cited

U.S. PATENT DOCUMENTS

| | | | |
|---|---|---|---|
| 2003/0018927 A1* | 1/2003 | Gadir | G06F 11/2005 714/4.11 |
| 2005/0240625 A1 | 10/2005 | Chang | |
| 2006/0087962 A1* | 4/2006 | Golia | H04L 69/40 370/216 |
| 2006/0171303 A1* | 8/2006 | Kashyap | H04L 47/10 370/228 |
| 2007/0198710 A1 | 8/2007 | Gopalakrishnan | |
| 2009/0106404 A1* | 4/2009 | Christenson | H04L 61/5014 709/222 |
| 2009/0158082 A1* | 6/2009 | Jain | H04L 69/40 714/4.11 |
| 2012/0051340 A1 | 3/2012 | Patil | |
| 2012/0087372 A1 | 4/2012 | Narasimhan | |
| 2013/0103376 A1 | 4/2013 | Gaddam | |
| 2014/0369204 A1* | 12/2014 | Anand | H04L 67/1004 370/235.1 |
| 2015/0220430 A1* | 8/2015 | Kim | G06F 13/28 709/217 |
| 2015/0271075 A1 | 9/2015 | Zhang | |
| 2015/0281367 A1* | 10/2015 | Nygren | H04L 65/1066 709/228 |
| 2017/0310583 A1* | 10/2017 | Bernstein | H04L 45/34 |
| 2018/0213441 A1 | 7/2018 | Mehta | |
| 2018/0287912 A1* | 10/2018 | Zabarsky | H04L 41/12 |
| 2020/0252335 A1* | 8/2020 | Kelam | H04L 45/46 |
| 2020/0272490 A1 | 8/2020 | Brown | |
| 2021/0320868 A1 | 10/2021 | Mericle | |

OTHER PUBLICATIONS

Sara Levy, "Managing Virtual IP (VIP) Pools", VAST Data website, May 2020, accessed Jan. 12, 2021 at https://support.vastdata.com/hc/en-us/articles/360016231794-Managing-Virtual-IP-VIP-Pools.

Prosecution History from U.S. Appl. No. 17/154,862, now issued U.S. Pat. No. 11,706,298, dated Jun. 29, 2021 through Mar. 15, 2023, 173 pp.

* cited by examiner

MULTICHANNEL VIRTUAL INTERNET PROTOCOL ADDRESS AFFINITY

CROSS REFERENCE TO OTHER APPLICATIONS

This application is a continuation of U.S. patent application Ser. No. 17/154,862 entitled MULTICHANNEL VIRTUAL INTERNET PROTOCOL ADDRESS AFFINITY filed Jan. 21, 2021 which is incorporated herein by reference for all purposes.

BACKGROUND OF THE INVENTION

A storage cluster comprised of a plurality of nodes may store a plurality of files that are accessible from a client (e.g., network attached storage (NAS) device, desktop client, application, computing device, virtual machine, computer, a desktop, a laptop, a smartphone, a tablet, etc.). The client may access (e.g., for backup, restore, etc.) the one or more of the files using a communication protocol, such as the server message block (SMB) protocol or the network file system (NFS) protocol. The client may experience TCP layer throttling delays in this communications environment. Other storage clusters may add additional hardware, such as a network interface card (NIC), to some or all of the nodes to increase throughput and/or bandwidth. However, such a solution adds additional hardware costs for the storage cluster. Also, additional throughput and/or bandwidth is not always required at all times. Thus, these other storage clusters may incur unnecessary costs to increase throughput and/or bandwidth that is not needed.

BRIEF DESCRIPTION OF THE DRAWINGS

Various embodiments of the invention are disclosed in the following detailed description and the accompanying drawings.

DETAILED DESCRIPTION

Figure 1A:
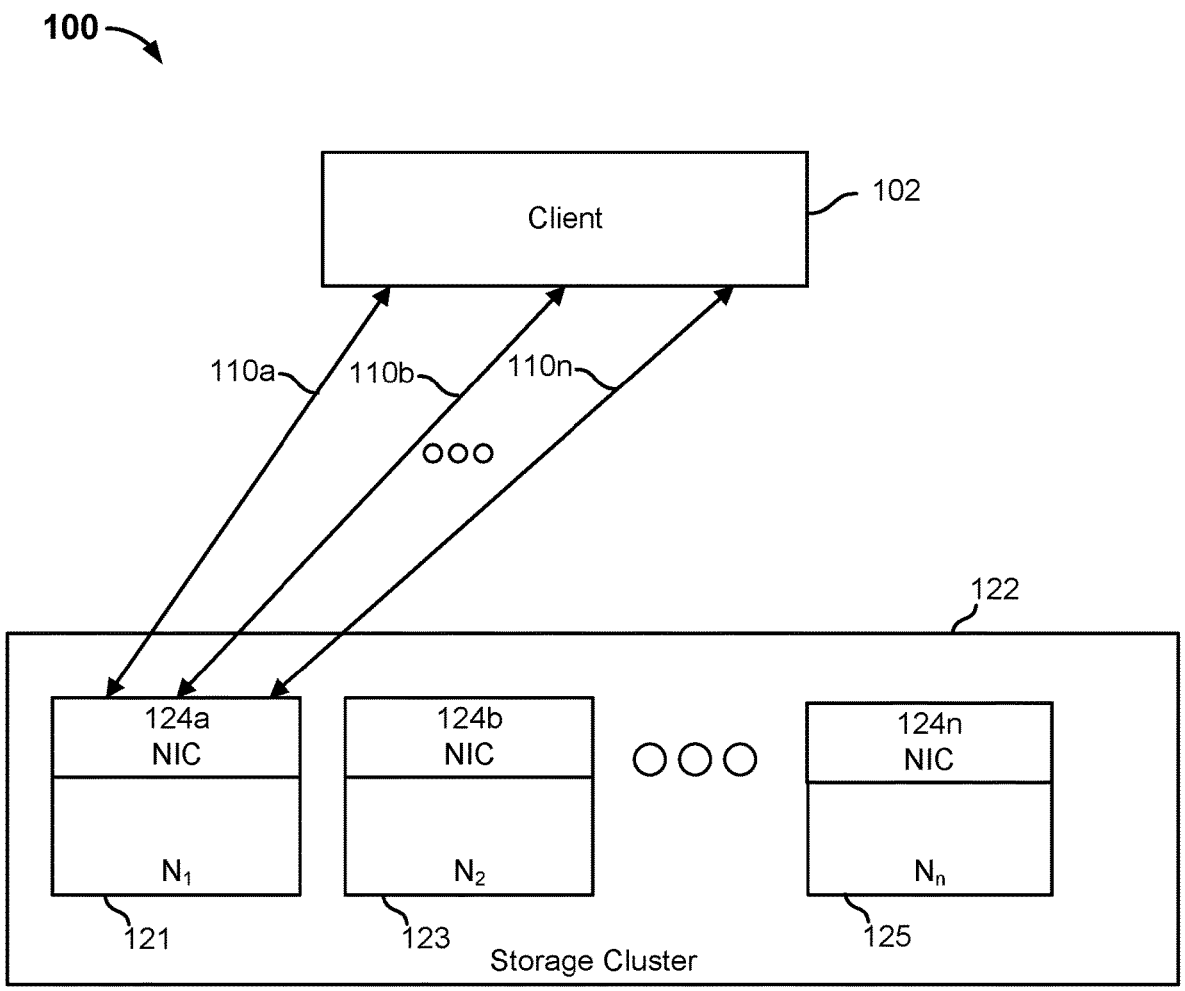
FIG. 1A is a block diagram illustrating an embodiment of a system for implementing multichannel VIP affinity.

A storage cluster is comprised of a plurality of nodes. Each node includes at least one network interface card. A client (e.g., NAS device, desktop client, application, computing device, virtual machine, computer, a desktop, a laptop, a smartphone, a tablet, etc.) communicating with the storage cluster using a communication protocol, such as the SMB protocol or the NFS protocol, may not get enough throughput because the client maintains a configurable fixed number of outstanding requests per session, which is applicable for any given session. Throughput between the storage cluster and the client may be increased by increasing the configured maximum number of outstanding requests per session, however, the storage cluster may not be authorized to increase the number of outstanding requests per session because the client controls this parameter. The storage cluster may be able to increase the throughput with additional NICs by increasing the number of connections for systems supporting a multichannel feature (e.g., SMB multichannel, nconnect) that allow bonding multiple TCP connections under a single session.

Other systems may enable the multichannel feature by combining the TCP connections of a plurality of nodes in a single session to aggregate the bandwidth of the nodes. Other systems may associate a single virtual internet protocol (VIP) address with each network interface card. However, the bandwidth available to the client is only able to scale based on the number of VIP addresses available for the client. Thus, these other systems need to increase the number of nodes and/or NICs to increase throughput, which adds additional costs (e.g., hardware, setup, maintenance).

Instead of adding additional NICs to some or all of the nodes, using the multichannel VIP affinity technique disclosed herein, a set of VIPs is assigned to each node of the storage cluster. The set of VIPs includes a corresponding primary VIP and one or more corresponding secondary VIPs.

A client establishes a communication session with a first node of the storage cluster using the primary VIP of a first set of VIPs associated with the first node. The communication session may be established to perform one or more data management services, such as backup, restore, disaster recovery, replication, migration, data analytics, security, etc. After the communication session is established, the client is permitted to communicate data, in parallel, with the first node using the primary VIP and the one or more secondary VIPs. This increases the throughput and bandwidth between the client and the first node without having to add additional hardware to the first node.

An affinity between the primary VIP and the one or more secondary VIPs exists. For example, the primary VIP of the first set is assigned to the first node. The one or more secondary VIPs of the first set are also assigned to the first node. Communications between the client and the first node may be interrupted. As a result, the primary VIP of the first set may be re-assigned to a second node. The one or more secondary IPs of the first set are also re-assigned to the second node. There is a delay associated with the communication interruption, i.e., an amount of time before communications are resumed. Migrating the primary VIP and the one or more secondary VIPs of the first set to the same node reduces the amount of time before communications are resumed. In the event the VIPs of the first set are separately assigned to different nodes of the storage cluster, the delay associated with the communication interruption is increased because the client needs to re-establish a communication session between itself and the storage cluster. This communication delay also increases the amount of time needed to perform a data management service, such as backup, restore, disaster recovery, replication, migration, data analytics, security, etc. Also, the first node may hold a lock to transfer data, via the plurality of VIPs associated with the node. In the event the plurality of VIPs associated with the first node are assigned to different nodes, the different nodes compete for a lock to complete the data transfer. The lock for the data may bounce between the plurality of nodes. This increases the amount of time needed to perform a data management service because the storage cluster is using time and resources to determine which node of the storage cluster should obtain the lock until the data transfer is completed. Migrating the primary VIP and the one or more secondary VIPs of the first set to the same node prevents a plurality of nodes of the storage cluster from competing to obtain a lock for the data that is transferred between a node and the client.

FIG. 1A is a block diagram illustrating an embodiment of a system 100 for implementing multichannel VIP affinity. In the example shown, client 102 is coupled to node 121 of storage cluster 122. Client 102 may be a NAS device, desktop client, application, computing device, virtual machine, computer, a desktop, a laptop, a smartphone, a tablet, etc.

Client 102 is capable of communicating with each of the nodes of storage cluster 122. Although three nodes are shown, storage cluster 122 may be comprised of n nodes. In some embodiments, a plurality of clients are concurrently communicating with a single node of storage cluster 122. One or more other clients (not shown) may be capable of communicating with other nodes of storage cluster 122.

In some embodiments, a node of storage cluster 122 includes a processor, memory, and a plurality of storage devices. The plurality of storage devices may include one or more solid state drives, one or more hard disk drives, or a combination thereof.

In some embodiments, a node of storage cluster 122 includes a processor and memory, and is coupled to a separate storage device. The separate storage device may include one or more storage devices (e.g., flash storage devices). A storage device may be segmented into a plurality of partitions. Each of the nodes 121, 123, 125 may be allocated one or more of the partitions. The one or more partitions allocated to a node may be configured to store data associated with some or all of the plurality of objects that were backed up to storage cluster 122. For example, the separate storage device may be segmented into 10 partitions and storage cluster 122 may include 10 nodes. A node of the 10 nodes may be allocated one of the 10 partitions.

In some embodiments, a node of storage cluster 122 includes a processor, memory, and a storage device. The node may be coupled to a separate storage device. The separate storage device may include one or more storage devices. A storage device may be segmented into a plurality of partitions. Each of the nodes 121, 123, 125 may be allocated one or more of the partitions. The one or more partitions allocated to a node may be configured to store data associated with some or all of the plurality of objects that were backed up to storage cluster 122. For example, the separate storage device may be segmented into 10 partitions and storage cluster 122 may include 10 nodes. A node of the 10 nodes may be allocated one of the 10 partitions.

In some embodiments, the nodes are homogenous nodes where each node has the same capabilities (e.g., processing, storage, memory, etc.). In some embodiments, at least one of the nodes is a heterogeneous node with different capabilities (e.g., processing, storage, memory, etc.) than the other nodes of storage cluster 122.

Client 102 is configured to communicate with node 121 via TCP connections 110a, 110b, 110n. TCP Connections 110a, 110b, 110n enable client 102 to communicate with node 121 via the TCP layer of the OSI model. Although FIG. 1A illustrates three TCP connections between client 102 and node 121, n TCP connections may be established between client 102 and node 121.

Although each node of storage cluster 122 is illustrated as having a single NIC (e.g., physical NIC or virtual NIC), a node may have one or more NICs. Other systems may enable multichannel communications by combining the TCP connections associated with nodes 121, 123, 125 in a single session to aggregate the bandwidth of nodes 121, 123, 125 and associate a single VIP address with each NIC 124a, 124b, 124n. However, the bandwidth available to the client in these other systems is only able to scale based on the number of VIP addresses available for the client. Instead of adding additional NICs to some or all of the nodes, using the multichannel VIP affinity technique disclosed herein, a set of VIPs is assigned to each NIC 124a, 124b, 124n of storage cluster 122.

NIC 124a may be associated with a particular network bandwidth rate (e.g., 1000 GB/s). Portions of the particular network bandwidth rate may be allocated to TCP connections 110a, 110b, 110n. In some embodiments, equal portions of the particular network bandwidth rate are allocated to the TCP connections. In some embodiments, at least one TCP connection has a greater portion of the particular network bandwidth rate than the other TCP connections.

Each TCP connection is associated with a separate VIP address. One of the TCP connections 110a, 110b, 110n is a primary VIP address associated with node 121 and the other TCP connections are secondary VIP addresses associated with node 121. In some embodiments, only the primary VIP address associated with node 121 is advertised to client 102. In some embodiments, node 121 advertises some or all of the VIP addresses associated with node 121.

After a communication session is established, client 102 is permitted to communicate with the node 121 using the primary VIP address and/or the one or more secondary VIP addresses. This increases the throughput and bandwidth between client 102 and node 121 without having to add additional hardware to node 121. The communication session may utilize some or all of the VIP addresses associated with node 121.

The number of TCP connections may be adaptively scaled up or scaled down. In some embodiments, the number of TCP connections is adaptively scaled up or scaled down based on resource availability of client 102, resource availability of a node, resource availability of a storage cluster, request type (e.g., SQL restore, Hyper-V restore), detected network characteristics (e.g., high latency for connection and/or available network bandwidth), service level agreements, etc. A TCP connection between a client and a node of a storage cluster may experience latency (even when there is sufficient available network bandwidth between the client and the node), which reduces the throughput between the client and the node of the storage cluster. Increasing the number of TCP connections may increase the throughput between the client and the node of the storage cluster because even though each TCP connection may experience latency, the overall throughput between the client and the node of the storage cluster has increased due to the increased number of TCP connections.

Figure 1B:
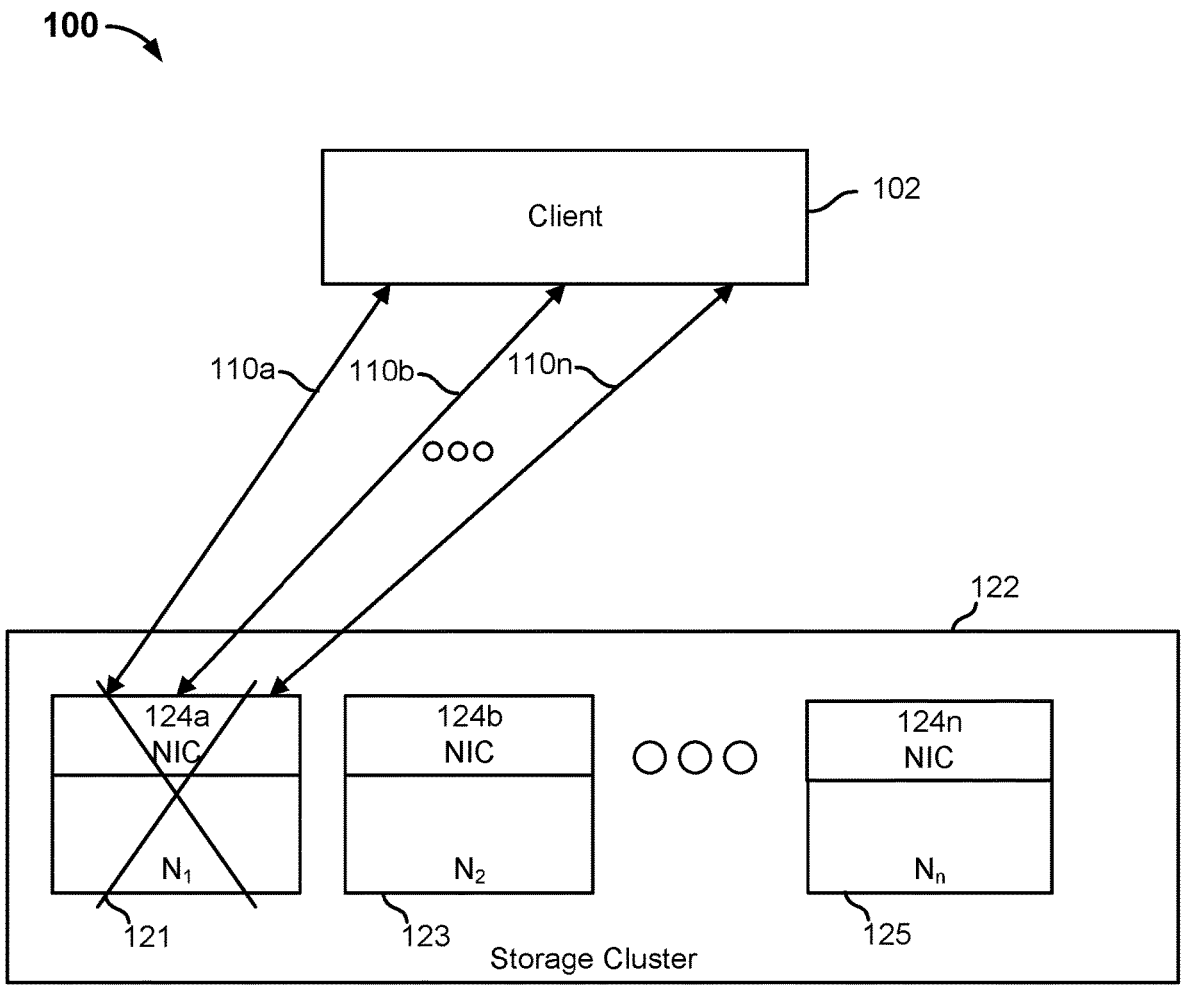
FIG. 1B is a block diagram illustrating an embodiment of a system for implementing multichannel VIP affinity.

FIG. 1B is a block diagram illustrating an embodiment of a system for implementing multichannel VIP affinity. In the example shown, node 121 of storage cluster 122 is unsuitable for communications with a client. A node may be unsuitable for communications with the client because the node is offline, has insufficient node resources available to participate in the communications with the client, is scheduled for maintenance, for load balancing purposes, etc. In some embodiments, node 121 is configured to send a heartbeat signal to other nodes of the storage cluster 122. In the event node 121 does not send the heartbeat signal within a threshold period of time, one of the other nodes may determine that node 121 is unsuitable for communications with client 102. In some embodiments, client 102 may determine that node 121 is unsuitable for communications in the event node 121 is unable to handle data port traffic.

Figure 1C:
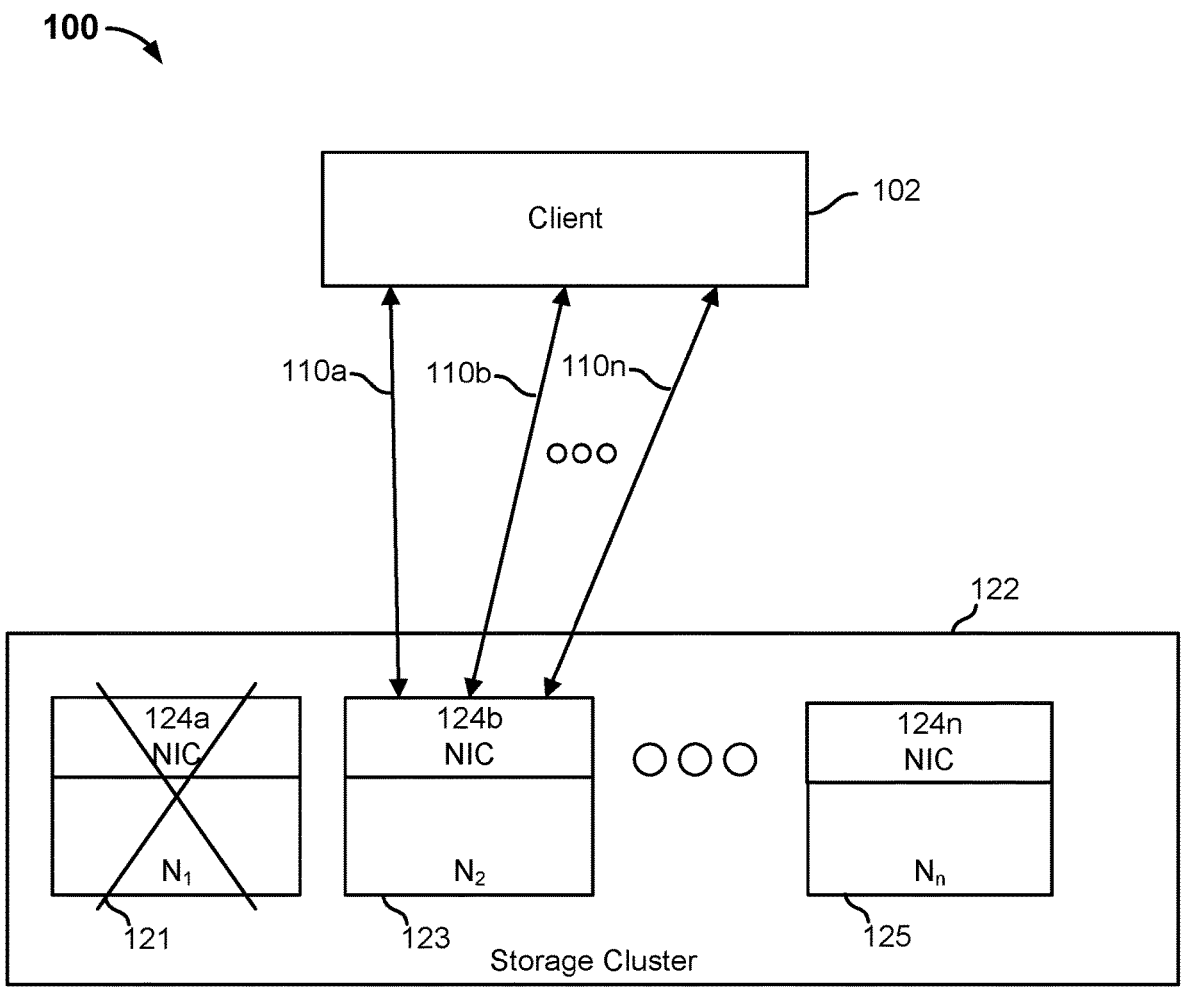
FIG. 1C is a block diagram illustrating an embodiment of a system for implementing multichannel VIP affinity.

FIG. 1C is a block diagram illustrating an embodiment of a system for implementing multichannel VIP affinity. In the example shown, node 121 is not suitable for communications with client 102. VIP addresses associated with node 121 are migrated to node 123. The VIP addresses include the primary VIP address and one or more VIP addresses associated with the node 121. The VIP addresses associated with node 121 may be migrated together to a different node of cluster 122 based on one or more factors, such as resource availability of a node, bandwidth availability associated with a node, number of NICs associated with a node, maximum throughput associated with an NIC, number of current VIPs associated with a node, round robin selection, CPU utilization, etc.

In some embodiments, the different node includes a single NIC and all of the VIP addresses are migrated to the single NIC. In some embodiments, the different node includes a link aggregated interface comprised of a plurality of NICs and the VIP addresses are link aggregated between the plurality of NICs of the different node as a single logical link. In this case, all of the VIPs are migrated to the single logical link, which may appear as a bonded interface to the client and can represent two or more physical NICs at the different node. Node 121 may also include a link aggregated interface.

There is a delay associated with the communication interruption, i.e., an amount of time before communications are resumed. Migrating the primary VIP and the one or more secondary VIPs of the first set to the same node reduces the amount of time before communications are resumed. In the event the VIPs associated with node 121 are separately assigned to different nodes of the storage cluster, the delay associated with the communication interruption is increased because the client needs to re-establish a communication session between itself and the storage cluster. This communication delay also increases the amount of time needed to perform a data management service, such as backup, restore, disaster recovery, replication, migration, data analytics, security, etc.

Figure 2:
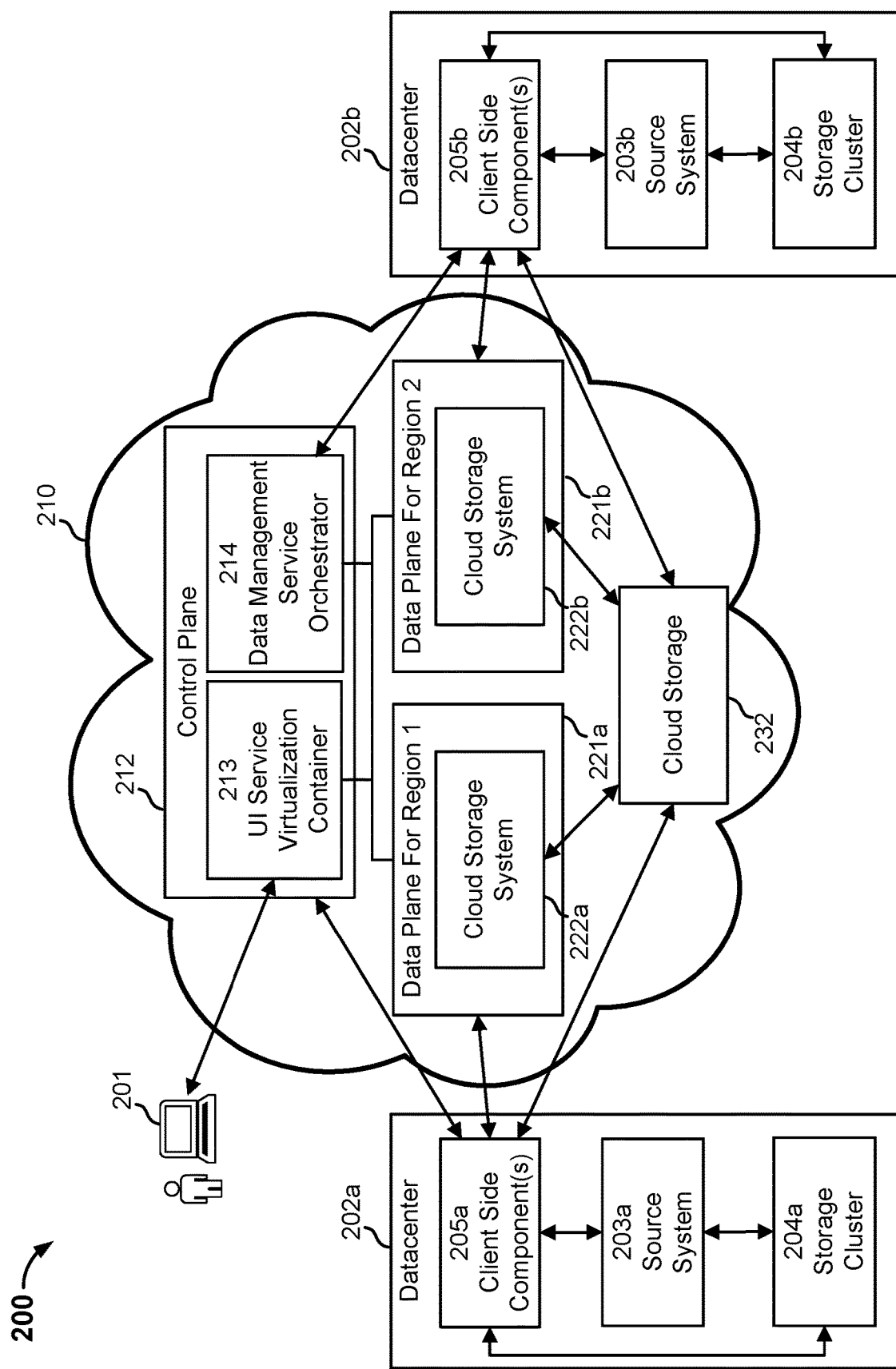
FIG. 2 is a block diagram illustrating an embodiment of a system for implementing multichannel VIP affinity.

FIG. 2 is a block diagram illustrating an embodiment of a system for implementing multichannel VIP affinity. In the example shown, system 200 enables a user to establish, via a graphical user interface of user device 201, an intent-based data management plan for one or more datacenters.

User device 201 may be a computer, a desktop, a laptop, a smartphone, a tablet, or any other computing device with a graphical user interface. User device 201 is associated with a user. The user may be associated with an entity, such as an individual, an enterprise, a government, a company, an organization, etc. The entity may store a plurality of objects in datacenters 202a, 202b. An object may correspond to a file, a database, a virtual machine, an application, a volume, etc. Although FIG. 2 depicts the entity being associated with two datacenters, an entity may be associated with one or more datacenters. In some embodiments, a datacenter is a hybrid or cloud-based datacenter.

A data management provider may establish a data management as a service (DMaaS) infrastructure in cloud environment 210 (e.g., public cloud, private cloud, hybrid cloud, etc.) provided by a cloud provider (e.g., Amazon Web Services™, Microsoft™ Azure, Google Cloud™, etc.). The DMaaS infrastructure may enable entities to remotely specify a data management plan for their data that is stored in one or more datacenters. The DMaaS infrastructure may include control plane 212 and one or more data planes, such as data planes 221a, 221b.

Control plane 212 is configured to manage the DMaaS infrastructure that enables users to remotely access and manage one or more objects associated with an entity. Control plane 212 includes a user interface (UI) service virtualization module 213 (e.g., container, virtual machine, pod) that enables user device 201 to communicate with the DMaaS infrastructure. UI service virtualization module 213 may receive from user device 201 an indication of a specification of a data pool and an indication of a specification of a data management service to apply to the data pool. A data pool is a description of one or more objects to be included in the data pool when the one or more data management services are performed.

In response, UI service virtualization module 213 may provide the data pool specification and the data management service specification to data management service orchestrator 214. The data pool specification and the data management service specification represent an intent of a user associated with user device 201. The data management service specification may include one or more data management plans corresponding to one or more data management services.

Data management service orchestrator 214 utilizes the data pool specification and the data management service specification to achieve the intent of the user associated with user device 201. For example, the data pool specified by the user may indicate that virtual machines having a particular tag at a particular location need a particular recovery point objective (RPO) and a particular recovery time objective (RTO). Data management service orchestrator 214 determines whether the intent is able to be achieved. In the event the intent of the user is unable to be achieved or unlikely to be achieved due to actual, estimated, or forecasted resources and/or loads, data management service orchestrator 214 may notify, via user device 201, the user that the intent is unable or unlikely to be achieved. In the event the intent of the user is able to be achieved, data management service orchestrator 214 may orchestrate the datacenter components of system 200 that are needed to achieve the intent (e.g., client side components 205a, 205b, source systems 203a, 203b, storage clusters 204a, 204b, cloud storage systems 222a, 222b, and/or cloud storage 232).

The intent may include a data management plan for backup, restore, disaster recovery, replication, migration, data analytics, security, etc. System 200 includes client side components 205a, 205b that communicate with data planes 221a, 221b via respective connections. The respective connections may communicate data via the TCP layer of the OSI model. A client side component may be a virtual machine, a container, a server, an application, etc. In some embodiments, client side components 205a, 205b are connected to source systems 203a, 203b, respectively. In some embodiments, client side components 205a, 205b are included in source systems 203a, 203b, respectively.

The client side component or the source system on which the client side component is hosted is associated with a single MC (e.g., physical NIC or virtual NIC). Instead of communicating with a respective data plane using a single TCP connection, client side components 205a, 205b may communicate data, in parallel, with data planes 221a, 221b, respectively, using a plurality of TCP layer connections associated with the single NIC, where each of the TCP layer connections is associated with a corresponding VIP address. The corresponding VIP addresses associated with the single NIC include a primary VIP address and one or more corresponding secondary VIP addresses.

In another example, source systems 203a, 203b include corresponding content (e.g., virtual machines, applications, files, filesystem data, containers, etc.) that is to be backed up to cloud storage 232. The client side components 205a, 205b are configured to receive the content to be backed up, in parallel, from source systems 203a, 203b, respectively using the plurality of TCP layer connections and to back up the received content, in parallel, to cloud storage 232 using the plurality of TCP layer connections.

In another example, storage clusters 204a, 204b include corresponding content (e.g., virtual machines, applications, files, filesystem data, containers, etc.) that is to be archived to cloud storage 232. The client side components 205a, 205b are configured to receive the content to be archived, in parallel, from storage clusters 204a, 204b, respectively using the plurality of TCP layer connections and to archive the received content, in parallel, to cloud storage 232 using the plurality of TCP layer connections.

In another example, source systems 203a, 203b are coupled to storage clusters 204a, 204b, respectively. Source systems 203a, 203b include corresponding content (e.g., virtual machines, applications, files, filesystem data, containers, etc.). In some embodiments, source systems 203a, 203b back up the content to storage clusters 204a, 204b, respectively. In some embodiments, storage clusters 204a, 204b restore the content to source systems 203a, 203b, respectively. Storage clusters 204a, 204b each include a corresponding set of nodes where each node includes at least one NIC. The at least one NIC is associated with a set of VIP addresses. In some embodiments, source system 203a is configured to communicate data, in parallel, to one of the nodes of storage cluster 204a using the set of VIP addresses associated with the node. In some embodiments, source system 203a is configured to communicate data, in parallel, to a subset of the nodes of storage cluster 204a using the set of VIP addresses associated with the subset of nodes. In some embodiments, source system 203a is configured to communicate data, in parallel, to all of the nodes of storage cluster 204a using the set of VIP addresses associated with all of the nodes. Source system 203b is configured to communicate data with storage cluster 204b in a similar manner.

Figure 3:
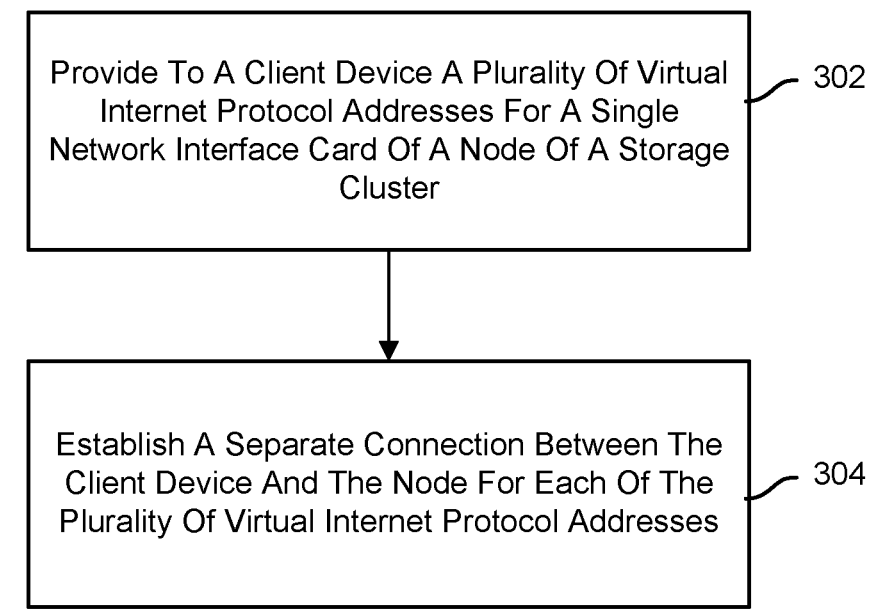
FIG. 3 is a flow diagram illustrating an embodiment of a process for establishing multichannel VIP affinity between a client and a node.

FIG. 3 is a flow diagram illustrating an embodiment of a process for establishing multichannel VIP affinity between a client and a node. In the example shown, process 300 may be implemented by a node, such as nodes 121, 123, 125.

At 302, a plurality of VIP addresses for a single network interface card of a node of a storage cluster is provided to a client. A node of the storage cluster includes a single NIC. The client communicating with the storage cluster using a communication protocol, such as the SMB protocol or the NFS protocol, may not get enough throughput because the client maintains a configurable fixed number of outstanding requests per session, which is applicable for any given session. Throughput between the storage cluster and the client may be increased by increasing the configured maximum number of outstanding requests per session, however, the storage cluster may not be authorized to increase the number of outstanding requests per session because the client controls this parameter. The storage cluster may be able to increase the throughput with additional NICs by increasing the number of connections for systems supporting a multichannel feature (e.g., SMB multichannel, nconnect) that allow bonding multiple TCP connections under a single session.

Other systems may enable the multichannel feature by combining the TCP connections of the nodes in a single session to aggregate the bandwidth of the nodes. Other systems may associate a single VIP address with each network interface card. However, the bandwidth available to the client is only able to scale based on the number of VIP addresses available for the client, which may be tied to the number of NICs of the system.

Instead of adding additional NICs to some or all of the nodes, a plurality of VIP addresses for a single NIC of a node of a storage cluster is provided to the client.

At 304, a separate connection is established between the client and the node for each of the plurality of VIP addresses. The separate connections are TCP layer connections. The plurality of VIPs includes a primary VIP and one or more secondary VIPs. The primary VIP of the node is advertised to the client. After a communication session is established, the client is permitted to communicate data, in parallel, with the node using the primary VIP address and/or the one or more secondary VIPs. This increases the throughput between the client and the first node without having to add additional hardware to the first node.

The NIC of the node may be associated with a particular network bandwidth rate (e.g., 1000 GB/s). Portions of the particular network bandwidth rate may be allocated to the separate TCP connections. In some embodiments, the equal portions of the particular network bandwidth rate are allocated to the TCP connections. In some embodiments, at least one TCP connection has a greater portion of the particular network bandwidth rate than the other TCP connections.

Figure 4:
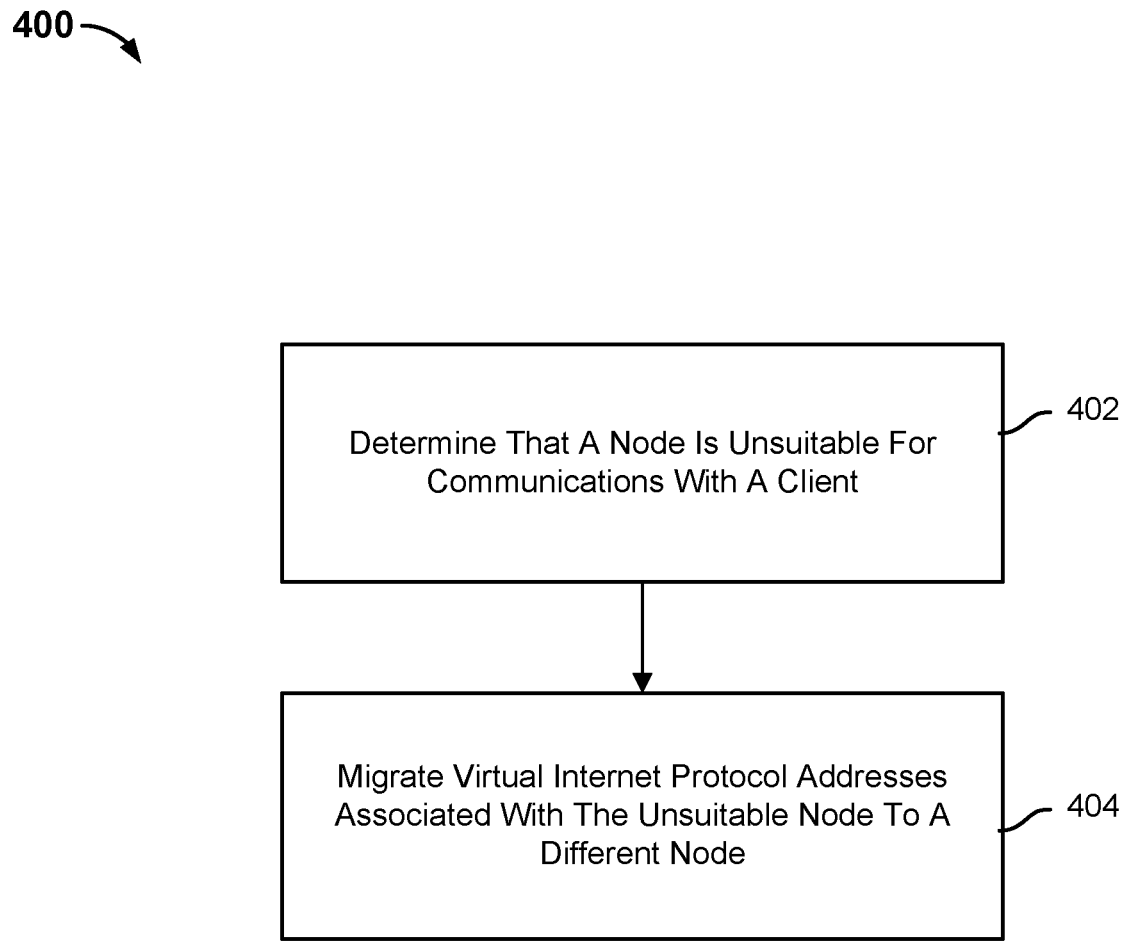
FIG. 4 is a flow diagram illustrating an embodiment of a process for maintaining multichannel communications between a client and a storage cluster.

FIG. 4 is a flow diagram illustrating an embodiment of a process for maintaining multichannel communications between a client and a storage cluster. In the example shown, process 400 may be implemented by a storage cluster, such as storage clusters 122, 204a, 204b. The plurality of virtual internet protocol addresses are maintained as a single group that is maintained together as assigned to a same second single network interface card during a failover to another node of the storage cluster.

At 402, a node is determined to be unsuitable for communications with a client. A storage cluster includes a plurality of nodes. A node may be unsuitable for communications with the client because the node is offline, has insufficient node resources available to participate in the communications with the client, is scheduled for maintenance, for load balancing purposes, etc. In some embodiments, a node is configured to send a heartbeat signal to other nodes of the storage cluster. In the event the node does not send the heartbeat signal within a threshold period of time, one of the other nodes may determine that the node is unsuitable for communications with the client. A client to which the node is communicating may determine that the node is unsuitable for communications in the event the node is unable to handle data port traffic.

At 404, VIP addresses associated with an NIC of the unsuitable node are migrated to a different node. The primary VIP address and one or more VIP addresses associated with the NIC of the unsuitable node are migrated together to a different node of the storage cluster. In some embodiments, the different node includes a single NIC and all of the VIP addresses are migrated to the single NIC. In some embodiments, the different node includes a link aggregated interface comprised of a plurality of NICs and the VIP addresses are link aggregated between the plurality of NICs of the different node as a single logical link. In this case, all of the VIPs are migrated to the single logical link, which may appear as a bonded interface to the client and can represent two or more physical NICs at the different node.

There is a delay associated with the communication interruption, i.e., an amount of time before communications are resumed. Migrating the primary VIP and the one or more secondary VIPs of the first set to the same node reduces the amount of time before communications are resumed. In the event the VIPs of the first set are separately assigned to different nodes of the storage cluster, the delay associated with the communication interruption is increased because the client needs to re-establish a communication session between itself and the storage cluster. This communication delay also increases the amount of time needed to perform a data management service, such as backup, restore, disaster recovery, replication, migration, data analytics, security, etc.

Figure 5:
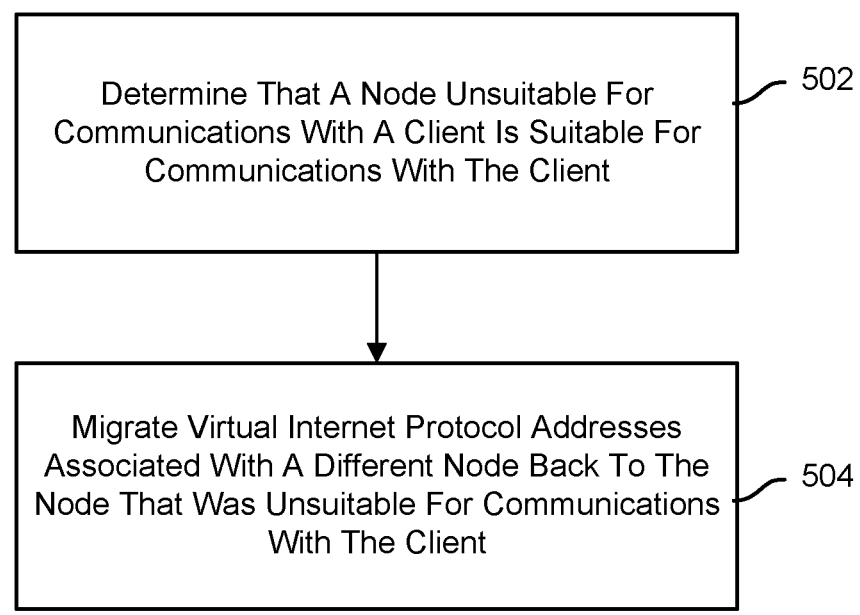
FIG. 5 is a flow diagram illustrating an embodiment of a process for maintaining multichannel communications between a client and a storage cluster.

FIG. 5 is a flow diagram illustrating an embodiment of a process for maintaining multichannel communications between a client and a storage cluster. In the example shown, process 500 may be implemented by a storage cluster, such as storage clusters 122, 204a, 204b.

At 502, a node unsuitable for communications with a client is determined to be suitable for communications with the client. For example, a node may be configured to send a heartbeat signal to other nodes of the storage cluster. One of the other nodes may receive the heartbeat signal.

At 504, VIP addresses associated with the node unsuitable for communications with a client that were migrated to a different node are migrated back to the node that was unsuitable for communications with the client. The node that was unsuitable for communications with the client is associated with a primary VIP and one or more secondary VIPs. The primary VIP and the one or more secondary VIPs are migrated back to the node that was unsuitable for communications with the client when the node is determined to be suitable for communications with the client.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
providing, to a client, a first group of virtual internet protocol addresses assigned to a first single network interface card of a first node of a plurality of nodes included in a storage cluster, wherein the first group of virtual internet protocol addresses includes a primary virtual network address associated with one or more secondary virtual network addresses that forms an affinity between the primary virtual network address and the one or more secondary virtual network addresses, wherein the first single network interface card is configured to utilize the primary virtual network address in parallel with the one or more secondary virtual network addresses to communicate data to and from the client after a communication session is established, and wherein the client is capable of communicating with the first node using the one or more secondary virtual network addresses after communications are established using the primary virtual network address;
establishing between the client and the first node of the storage cluster the communication session that enables the client and the first single network interface card of the first node of the storage cluster to communicate data, in parallel, via the primary virtual network address and the one or more secondary virtual network addresses;
performing a data management service by transferring in parallel, via the primary virtual network address associated with the first single network interface card of the first node and the one or more secondary virtual network addresses associated with the first single network interface card of the first node, data associated with the data management service from the client to the first node of the storage cluster and from the first node of the storage cluster to the client, wherein the first group of virtual internet protocol addresses are associated with one network interface card at a time during a performance of the data management service;
reassigning the primary virtual network address from the first single network interface card of the first node to a second single network interface card of a second node of the plurality of nodes in the storage cluster; and
responsive to reassigning the primary virtual network address and based on the affinity, reassigning the one or more secondary virtual network addresses from the first single network interface card of the first node to the second single network interface card of the second node of the plurality of nodes in the storage cluster.

2. The method of claim 1, wherein the primary virtual network address associated with the first node is advertised to the client.

3. The method of claim 1, wherein a number of transmission control protocol (TCP) connections associated with the first node is adaptively scaled up or scaled down based at least in part on a detected latency between the first node and the client while the data management service is being performed, resource availability of the client, resource availability of the first node, resource availability of the storage cluster, network characteristics associated with the communications between the first node and the client, and/or service level agreements.

4. The method of claim 3, wherein each of the TCP connections is associated with a separate virtual internet protocol address.

5. The method of claim 1, wherein each of the plurality of nodes is associated with a corresponding single network interface card.

6. The method of claim 5, wherein each of the corresponding single network interface cards is associated with a corresponding set of virtual internet protocol addresses.

7. The method of claim 1, wherein a third node of the plurality of nodes includes a second single network interface card and is associated with a second group of virtual internet protocol addresses.

8. The method of claim 7, wherein the third node of the storage cluster includes a link aggregated interface.

9. The method of claim 1, further comprising determining that the first node is unsuitable for communications with the client.

10. The method of claim 9, further comprising migrating the first group of virtual internet protocol addresses to the second node of the storage cluster in response to determining that the first node is unsuitable for communications with the client.

11. The method of claim 10, wherein the second node is selected based on resource availability associated with the second node, bandwidth availability associated with the second node, a number of network interface cards associated with the second node, a maximum throughput associated with a network interface card associated with the second node, a number of current virtual internet protocol addresses associated with the second node, a round robin selection, and/or CPU utilization associated with the second node.

12. The method of claim 10, further comprising resuming the data management service by establishing corresponding separate connections between the client and the second node for each of the virtual internet protocol addresses included in the first group.

13. The method of claim 12, further comprising,
determining that the first node is suitable for communications with the client, and
in response to determining that the first node is suitable for communications with the client, migrating the first group of virtual internet protocol addresses from the second node of the storage cluster back to the first node of the storage cluster.

14. A computer program product embodied in a non-transitory computer readable medium and comprising computer instructions that, when executed by one or more processors, cause the one or more processors to:
provide, to a client, a first group of virtual internet protocol addresses assigned to a first single network interface card of a first node of a plurality of nodes included in a storage cluster, wherein the first group of virtual internet protocol addresses includes a primary virtual network address associated with one or more secondary virtual network addresses that forms an affinity between the primary virtual network address and the one or more secondary virtual network addresses, wherein the first single network interface card is configured to utilize the primary virtual network address in parallel with the one or more secondary virtual network addresses to communicate data to and from the client after a communication session is established, and wherein the client is capable of communicating with the first node using the one or more secondary virtual network addresses after communications are established using the primary virtual network address;
establish between the client and the first node of the storage cluster the communication session that enables the client and the first single network interface card of the first node of the storage cluster to communicate data, in parallel, via the primary virtual network address associated with the first node and the one or more secondary virtual network addresses associated with the first node;
perform a data management service by transferring in parallel, via the primary virtual network address associated with the first single network interface card of the first node and the one or more secondary virtual network addresses associated with the first single network interface card of the first node, data associated with the data management service from the client to the first node of the storage cluster and from the first node of the storage cluster to the client, wherein the first group of virtual internet protocol addresses are associated with one network interface card at a time during a performance of the data management service;
reassign the primary virtual network address from the first single network interface card of the first node to a second single network interface card of a second node of the plurality of nodes in the storage cluster; and
responsive to reassigning the primary virtual network address and based on the affinity, reassign the one or more secondary virtual network addresses from the first single network interface card of the first node to the second single network interface card of the second node of the plurality of nodes in the storage cluster.

15. The computer program product of claim 14, further comprising computer instructions that, when executed by one or more processors, cause the one or more processors to determine that the first node is unsuitable for communications with the client.

16. The computer program product of claim 15, further comprising computer instructions that, when executed by the one or more processors, cause the one or more processors to migrate the first group of virtual internet protocol addresses to the second node of the storage cluster in response to determining that the first node is unsuitable for communications with the client.

17. The computer program product of claim 16, further comprising computer instructions that, when executed by the one or more processors, cause the one or more processors to resume the data management service by establishing corresponding separate connections between the client and the second node for each of the virtual internet protocol addresses included in the first group.

18. The computer program product of claim 17, further comprising computer instructions that, when executed, by the one or more processors, cause the one or more processors to:
determine that the first node is suitable for communications with the client; and
in response to determining that the first node is suitable for communications with the client, migrate the first group of virtual internet protocol addresses from the second node of the storage cluster back to the first node of the storage cluster.

19. A system, comprising:
a processor configured to:
provide, to a client, a first group of virtual internet protocol addresses assigned to a first single network interface card of a first node of a plurality of nodes included in a storage cluster, wherein the first group of virtual internet protocol addresses includes a primary virtual network address associated with one or more secondary virtual network addresses that forms an affinity between the primary virtual network address and the one or more secondary virtual network addresses, wherein the first single network interface card is configured to utilize the primary virtual network address in parallel with the one or more secondary virtual network addresses to communicate data to and from the client after a communication session is established, and wherein the client is capable of communicating with the first node using the one or more secondary virtual network addresses after communications are established using the primary virtual network address;

establish between the client and the first node of the storage cluster the communication session that enables the client and the first single network interface card of the first node of the storage cluster to communicate data, in parallel, via the primary virtual network address associated with the first node and the one or more secondary virtual network addresses associated with the first node;

perform a data management service by transferring in parallel, via the primary virtual network address associated with the first single network interface card of the first node and the one or more secondary virtual network addresses associated with the first single network interface card of the first node, data associated with the data management service from the client to the first node of the storage cluster and from the first node of the storage cluster to the client, wherein the first group of virtual internet protocol addresses are associated with one network interface card at a time during a performance of the data management service;

reassign the primary virtual network address from the first single network interface card of the first node to a second single network interface card of a second node of the plurality of nodes in the storage cluster; and responsive to reassigning the primary virtual network address and based on the affinity, reassign the one or more secondary virtual network addresses from the first single network interface card of the first node to the second single network interface card of the second node of the plurality of nodes in the storage cluster; and a memory coupled to the processor and configured to provide the processor with instructions.

* * * * *